US012783017B2

(12) United States Patent
Lee et al.

(10) Patent No.: US 12,783,017 B2
(45) Date of Patent: Nov. 3, 2026

(54) 360-DEGREE HINGE MODULE FOR PORTABLE TERMINAL

(71) Applicant: PARTSTEC CONSTRUCTION CO., LTD, Gumi-Si (KR)

(72) Inventors: Young Tak Lee, Gumi-Si (KR); Kil Seok Jeong, Gumi-Si (KR)

(73) Assignee: PARTSTEC CONSTRUCTION CO., LTD, Gumi-Si (KR)

( * ) Notice: Subject to any disclaimer, the term of this patent is extended or adjusted under 35 U.S.C. 154(b) by 156 days.

(21) Appl. No.: 18/880,607

(22) PCT Filed: Aug. 2, 2023

(86) PCT No.: PCT/KR2023/011355
§ 371 (c)(1),
(2) Date: Jan. 2, 2025

(87) PCT Pub. No.: WO2024/039118
PCT Pub. Date: Feb. 22, 2024

(65) Prior Publication Data

US 2025/0390149 A1 Dec. 25, 2025

(30) Foreign Application Priority Data

Aug. 19, 2022 (KR) ........................ 10-2022-0104138

(51) Int. Cl.
*G06F 1/16* (2006.01)

(52) U.S. Cl.
CPC .......... *G06F 1/1681* (2013.01); *G06F 1/1618* (2013.01); *G06F 1/1683* (2013.01)

(58) Field of Classification Search
CPC .... G06F 1/1616; G06F 1/1618; G06F 1/1681; F16C 11/04
See application file for complete search history.

(56) References Cited

U.S. PATENT DOCUMENTS 9,524,000 B2 * 12/2016 Hsu ........................ G06F 1/1681
2013/0111704 A1 * 5/2013 Mitsui ................... G06F 1/1681 16/250
2013/0318746 A1 * 12/2013 Kuramochi ........... G06F 1/1681 16/371
2017/0351303 A1 * 12/2017 Kuramochi ........... G06F 1/1681
2021/0240231 A1 * 8/2021 Ku ........................ G06F 1/1618

FOREIGN PATENT DOCUMENTS

KR 20130041098 A 4/2013
KR 20170136983 A 12/2017

OTHER PUBLICATIONS

International Search Report of PCT Patent Application No. PCT/KR2023/011355 issued on Nov. 23, 2023.

* cited by examiner

*Primary Examiner* — Anthony Q Edwards

(57) ABSTRACT

The present invention relates to a 360-degree hinge module for a portable terminal and, more particularly, to a 360-degree hinge module for a portable terminal, which is attached to a portable terminal such as a laptop computer, etc. to enable smooth rotation and allow a free-stop function to be implemented firmly at a certain angle.
According to the present invention, an open angle can be firmly maintained due to contact between a frictional spring and a shaft within a range between a first angle and a second angle, in which rotation is carried out in a free-stop manner, and even when a user touches a panel, shaking of the panel can be minimized.

7 Claims, 9 Drawing Sheets

(a)

(b)

360-DEGREE HINGE MODULE FOR PORTABLE TERMINAL

TECHNICAL FIELD

The present invention relates to a 360-degree hinge module for a portable terminal and, more particularly, to a 360-degree hinge module for a portable terminal, which is attached to a portable terminal such as a laptop computer, etc. to enable smooth rotation and allow a free-stop function to be implemented firmly at a certain angle.

BACKGROUND ART

In general, portable terminals such as cellular phones, PDAs, laptop computers, and DMB phones are widely used to wirelessly access services such as communication services and broadcasting services not at a fixed location but during moving from a location.

The portable terminals have become essential items that cannot be overlooked in order to enjoy the convenience of life in the information age, and in particular, consumer targets for the cellular phones are very broad ranging from elementary, middle, and high school students to the elderly.

As described above, a recent rapid increase in demand and user base for the portable terminals causes consumers to expect products with new designs or functions.

The portable terminals have a configuration in which a main body equipped with a keypad and a cover equipped with a display panel are coupled to be openable and closable with respect to each other, and the portable terminals are classified into a folding type, a sliding type, and a swing type depending on opening and closing structures of covers with respect to main bodies.

In particular, of the types, the portable terminals in which the cover is opened and closed in a folding manner is one of the most commonly used types recently due to various advantages such as ease of use, a low failure rate, and having a sleek design.

This folding-type portable terminals can open and close the cover in a vertical direction with respect to the main body by a hinge device. The hinge device enables the opening and closing to be performed at an angle (about 150 to 180 degrees) using various structures.

Meanwhile, recently, there is a demand for development of a hinge device that enables a cover to rotate 360 degrees with respect to a main body in order to utilize a display of a portable terminal as a relatively large area.

In this regard, in the related art, hinge devices that include two shafts and gears which interlock with the respective shafts, are developed.

However, in the hinge module in the related art as described above, problems arise in that shaking occurs in the hinge module due to tolerances between the two shafts and other components during rotation, which eventually results in slight shaking of a foldable portable terminal in a rotation direction of the shafts without accurate fixing of the portable terminal when the portable terminal is opened at a certain angle.

SUMMARY OF INVENTION

Technical Problem

The present invention is made to solve the above-described problems, and an object thereof is to provide a 360-degree hinge module for a portable terminal which is attached to a portable terminal such as a laptop computer, minimizes shaking due to a tolerance of a component during opening and closing performed by rotation, and enables a free-stop function to be implemented firmly at a certain angle.

Solution to Problem

In order to achieve the object, provided is a 360-degree hinge module for a portable terminal of the present invention which couples a first panel and a second panel to each other in a rotatable manner, the 360-degree hinge module including: a bracket that includes a first bracket coupled to the first panel and a second bracket coupled to the second panel and has rotary cam surface formed on one side; a shaft that includes a first shaft coupled to one side of the first bracket and a second shaft coupled to one side of the second bracket; a power transmission unit that connects the first shaft and the second shaft and rotates the shafts in opposite directions; a sliding cam that is penetrated by the first shaft and the second shaft and has a fixed cam surface formed to be in contact with the rotary cam surface; a compression spring that elastically supports the sliding cam toward the bracket; and a friction spring that connects the first shaft and the second shaft to each other while one end of the friction spring wraps around an outer circumferential surface of the first shaft and the other end wraps around an outer circumferential surface of the second shaft. The first bracket and the second bracket are configured to be automatically rotated toward 0 degrees to which one surface of the first bracket and one surface of the second bracket come closer to each other as the rotary cam surface and the fixed cam surface are in contact with each other in a first zone from 0 degrees to a preset first angle, to be rotated in a free-stop manner due to friction generated by contact between a protrusion of the rotary cam surface and a protrusion of the fixed cam surface and friction generated by wrapping of the friction spring around the first shaft and the second shaft in a second zone from an angle larger than the first angle to an angle smaller than a preset second angle, and to be automatically rotated toward 360 degrees to which the other surface of the first bracket and the other surface of the second bracket come closer to each other as the rotary cam surface and the fixed cam surface are in contact with each other in a third zone from the second angle to 360 degrees.

Friction between the friction spring and the shaft in the first zone and the third zone is lower than rotational force by the contact between the rotary cam surface and the fixed cam surface, and friction between the friction spring and the shaft in the second zone is greater than the friction between the friction spring and the shaft in the first zone and the third zone.

No rotational force is generated by the contact between the rotary cam surface and the fixed cam surface in the second zone.

Outer circumferential surfaces of the other ends of the first shaft and the second shaft formed in a cylindrical shape have respective pairs of cut surfaces formed in parallel. The friction spring has, on both sides, a first fitting groove and a second fitting groove into which the other end of the first shaft and the other end of the second shaft are respectively inserted, and the first fitting groove and the second fitting groove have respective opening holes formed to be open outward. Friction is generated as an inner circumferential surface of the first fitting groove and the outer circumferential surface of the first shaft are in contact with each other and an inner circumferential surface of the second fitting groove and the outer circumferential surface of the second shaft are in contact with each other. Here, a contact area between the friction spring and the shaft in the second zone is larger than a contact area between the friction spring and the shaft in the first zone and the third zone.

The first fitting groove and the second fitting groove have respective escape grooves formed to be more deeply recessed toward a center of the friction spring. In the first zone and the third zone, the outer circumferential surface of the shaft faces the escape grooves and the opening holes, and the cut surfaces are separated from and face the inner circumferential surfaces of the first fitting groove and the second fitting groove, and in the second zone, the outer circumferential surface of the shaft is in contact with the inner circumferential surfaces of the first fitting groove and second fitting groove. The cut surfaces face the escape grooves and the opening grooves.

The escape grooves are filled with lubricant.

The friction spring is formed in a plate shape, and multiple friction springs are layered and arranged in a longitudinal direction of the shaft.

Advantageous Effects of Invention

According to the 360-degree hinge module for a portable terminal of the present invention as described above, the following effects will be achieved.

According to the present invention, the 360-degree hinge module is attached to a portable terminal, minimizes shaking due to a tolerance of a component during opening and closing performed by rotation, and enables a free-stop function to be implemented firmly at a certain angle.

The present invention enables the portable terminal to be rotated and opened to 360 degrees and to be automatically rotated toward 0 degrees when no external force is applied from 0 degrees to a first angle, to implement free stop by using the strong friction depending on a wide contact area from an angle larger than the first angle to an angle smaller than the second angle, and to be automatically rotated toward 360 degrees when no external force is applied from the second angle to 360 degrees.

In particular, according to the present invention, contact between a friction spring and a shaft enables an open angle to be firmly maintained between the first angle and the second angle in which rotation is performed in a free-stop manner, and enables shaking of a panel to be minimized even when a user touches the panel.

DESCRIPTION OF EMBODIMENTS

Figure 1:
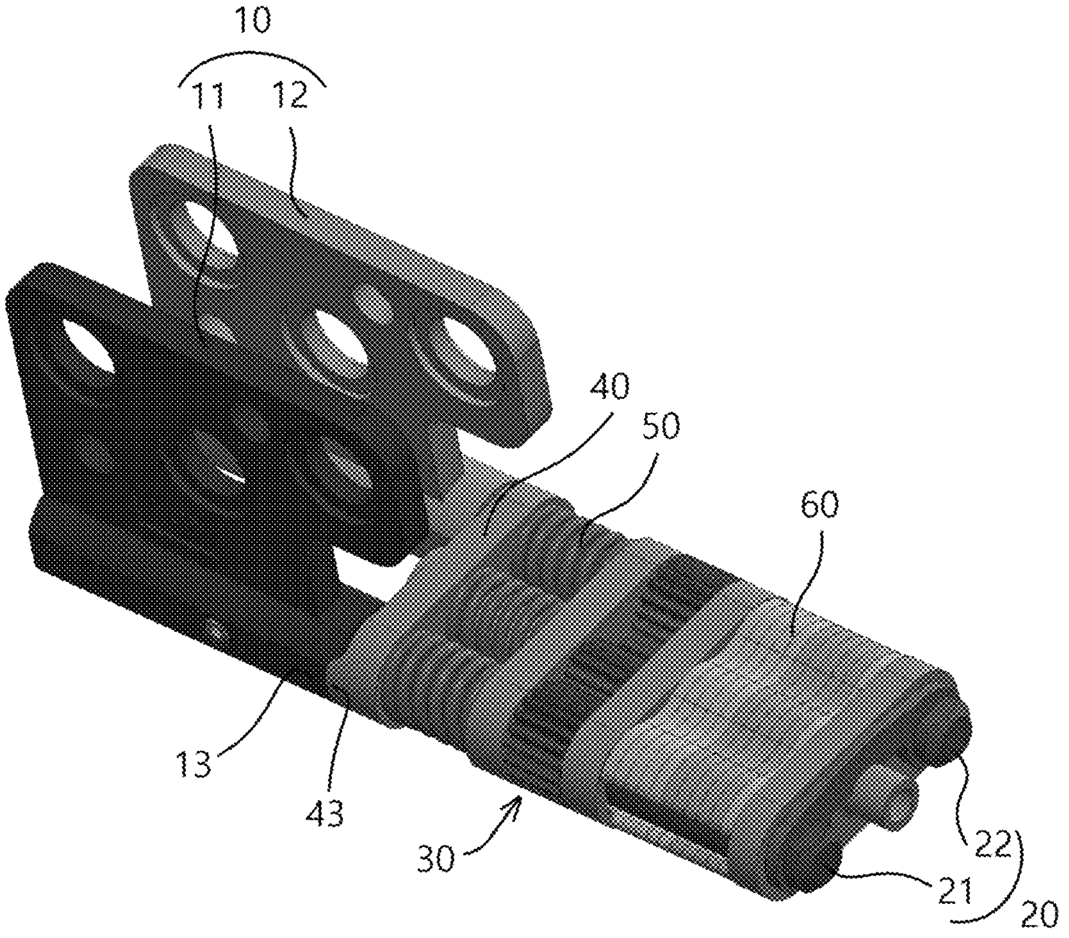
FIG. 1 is a perspective view of a hinge module according to an embodiment of the invention.
Figure 2:
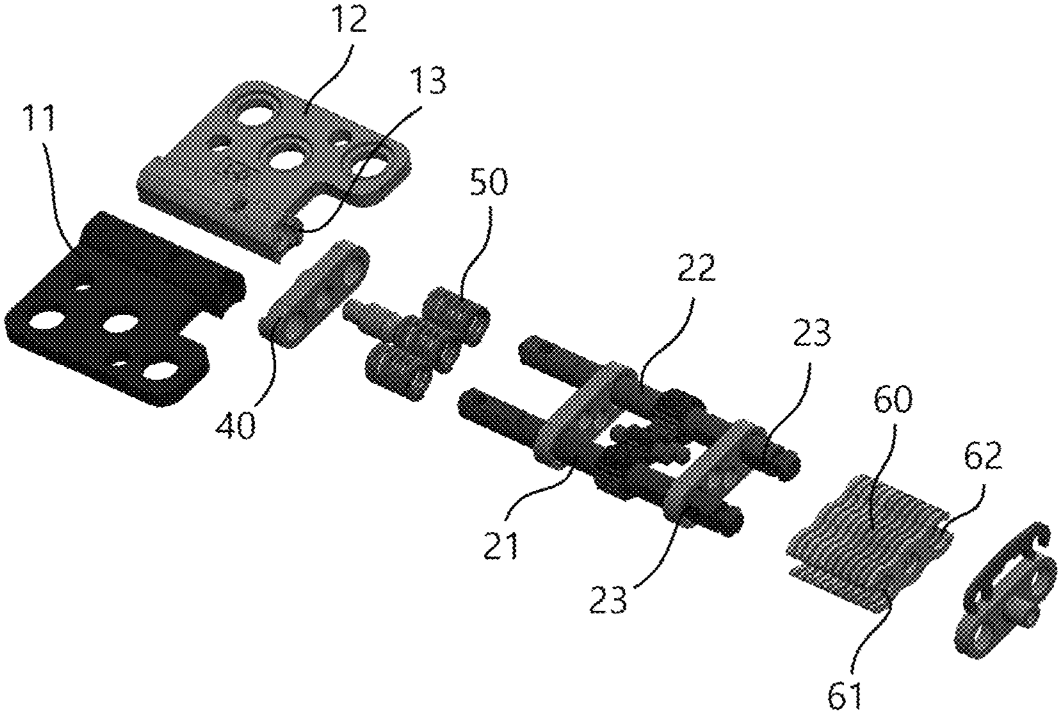
FIG. 2 is an exploded perspective view in one direction of the hinge module according to the embodiment of the present invention.
Figure 3:
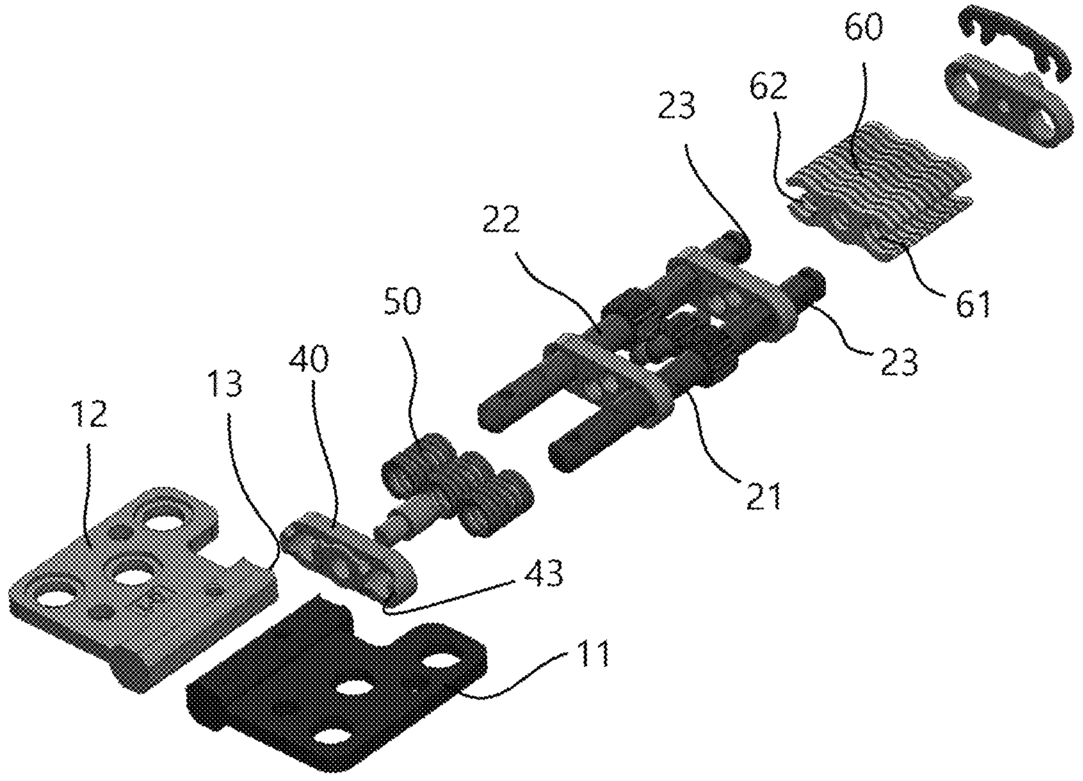
FIG. 3 is an exploded perspective view in the other direction illustrating the hinge module according to the embodiment of the present invention.

A 360-degree hinge module for a portable terminal of the present invention couples a first panel and a second panel of the portable terminal rotatably and includes, as shown in FIGS. 1 to 5, a bracket 10, a shaft 20, a power transmission unit 30, a sliding cam 40, a compression spring 50, and a friction spring 60.

The bracket 10 includes a first bracket 11 coupled to the first panel and a second bracket 12 coupled to the second panel.

The first bracket 11 and the second bracket 12 have respective rotary cam surfaces 13 formed on one side thereof.

The first bracket 11 and the second bracket 12 have the same shape.

The shaft 20 includes a first shaft 21 coupled to one side of the first bracket 11 and a second shaft 22 coupled to one side of the second bracket 12.

The first shaft 21 and the second shaft 22 are arranged parallel to each other.

The first shaft 21 and the second shaft 22 have the same shape.

The first shaft 21 and the second shaft 22 may be integrally coupled to the first bracket 11 and the second bracket 12, respectively, or may be separately manufactured and then coupled to each other by assembly.

The first shaft 21 is rotated together with the first bracket 11, and the second shaft 22 is rotated together with the second bracket 12.

The rotary cam surface 13 is exposed toward the shaft 20 when the shaft 20 is coupled to the bracket 10.

Outer circumferential surfaces of the other ends of the first shaft 21 and the second shaft 22 formed in a cylindrical shape have respective pairs of cut surfaces 23 formed in parallel.

The power transmission unit 30 connects the first shaft 21 and the second shaft 22 and rotates the shafts in opposite directions.

In this embodiment, the power transmission unit 30 includes multiple gears that connect the first shaft 21 and the second shaft 22.

The sliding cam 40 is penetrated by the first shaft 21 and the second shaft 22 and has a fixed cam surface 43 formed to be in contact the rotary cam surface 13.

The sliding cam 40 moves linearly along the first shaft 21 and the second shaft 22.

The compression spring 50 elastically supports the sliding cam 40 toward the bracket 10.

Hence, elastic force of the compression spring 50 causes the fixed cam surface 43 to be in contact with the rotary cam surface 13 in a free state.

Figure 4:
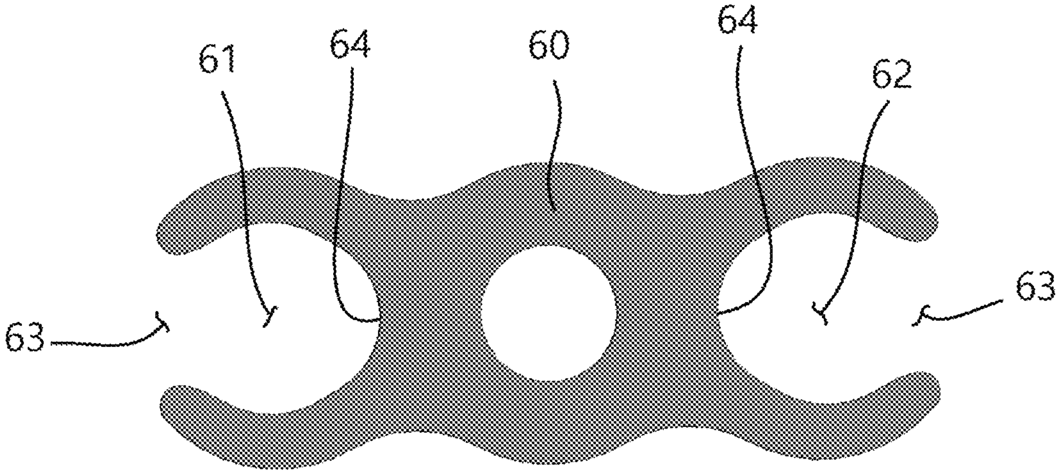
FIG. 4 is a front view of a friction spring of the hinge module according to the embodiment of the present invention.
Figure 5:
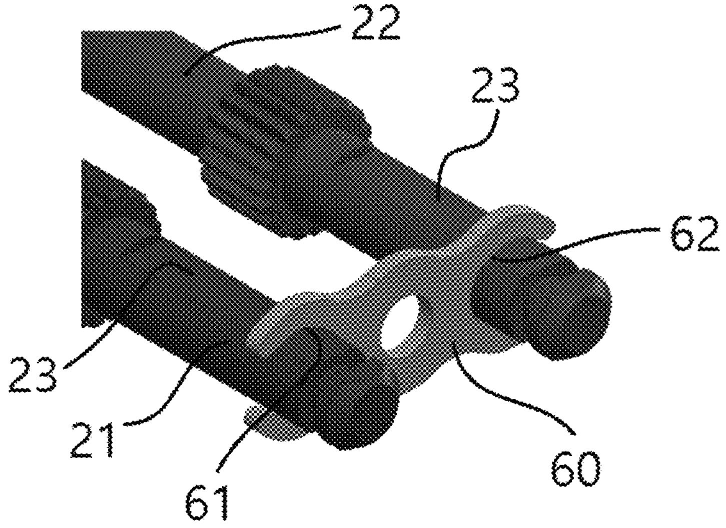
FIG. 5 illustrates a perspective view and a front view of a shaft and the friction spring of the hinge module according to the embodiment of the present invention.
Figure 5:
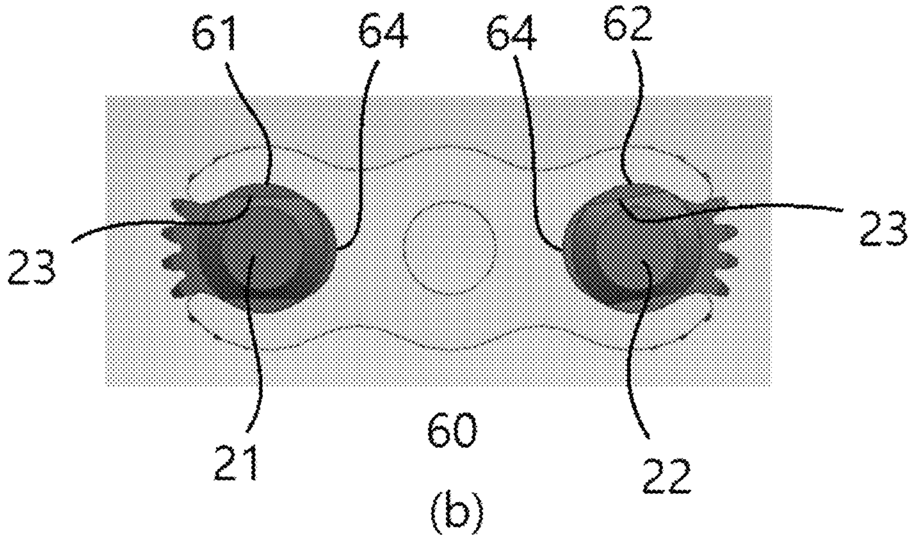

As shown in FIGS. 4 and 5, the friction spring 60 connects the first shaft 21 and the second shaft 22 to each other while one end of the friction spring wraps around an outer circumferential surface of the first shaft 21 and the other end thereof wraps around an outer circumferential surface of the second shaft 22.

The friction spring 60 is formed in a plate shape, and multiple friction springs are layered and arranged in a longitudinal direction of the shaft 20.

The friction spring 60 has, on both sides, a first fitting groove 61 and a second fitting groove 62 into which the other end of the first shaft 21 and the other end of the second shaft 22 are respectively inserted.

As described above, a single friction spring 60 holds both the first shaft 21 and the second shaft 22 to form a large mass, and thus it is possible to minimize the occurrence of easy shaking or vibration of the individual first and second shafts 21 and 22 due to an external force or product tolerance.

The first fitting groove 61 and the second fitting groove 62 have respective opening holes 63 formed to be open outward.

Friction is generated as an inner circumferential surface of the first fitting groove 61 and the outer circumferential surface of the first shaft 21 are in contact with each other, and friction is generated as an inner circumferential surface of the second fitting groove 62 and the outer circumferential surface of the second shaft 22 are in contact with each other.

Further, the first fitting groove 61 and the second fitting groove 62 have respective escape grooves 64 formed to be more deeply recessed toward a center of the friction spring 60.

The escape grooves 64 are not in contact with an outer circumferential surface of the shaft 20.

The escape grooves 64 may be filled with lubricant.

When the escape grooves 64 are filled with lubricant, the lubricant filling the escape grooves 64 can be supplied during long-term use of the hinge module, thereby enabling the hinge module to operate smoothly for an extended period.

Further, the escape groove 64 also fulfills a function of a space in which foreign substances accumulate when the foreign substances are produced.

Hereinafter, an operation process of the present invention having the aforementioned configuration will be described.

In this embodiment, a zone opened from an angle of 0 to a preset first angle between the first bracket 11 and the second bracket 12 is referred to as a first zone, a zone opened from an angle greater than the first angle to an angle smaller than a preset second angle is referred to as a second zone, and a zone opened from the second angle to 360 degrees is referred to as a third zone.

In this embodiment, the first angle was set to 10 degrees, and the second angle was set to 350 degrees.

Hence, the first zone is from 0 degrees to 10 degrees, the second zone is 11 degrees to 349 degrees, and the third zone is 350 degrees to 360 degrees.

Figure 6:
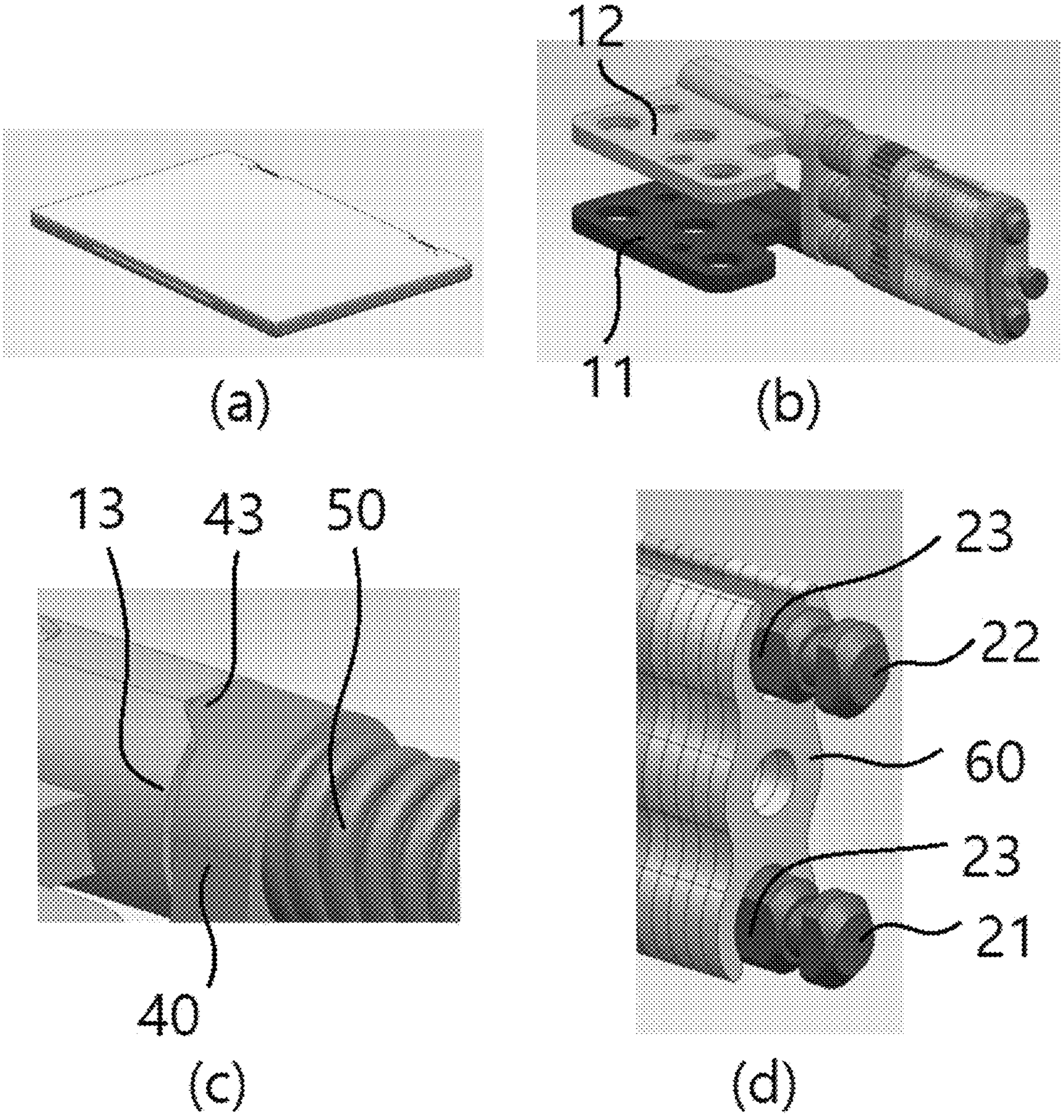
FIG. 6 is a configurational view of a state in which the hinge module is closed to 0 degrees according to the embodiment of the present invention.
Figure 10:
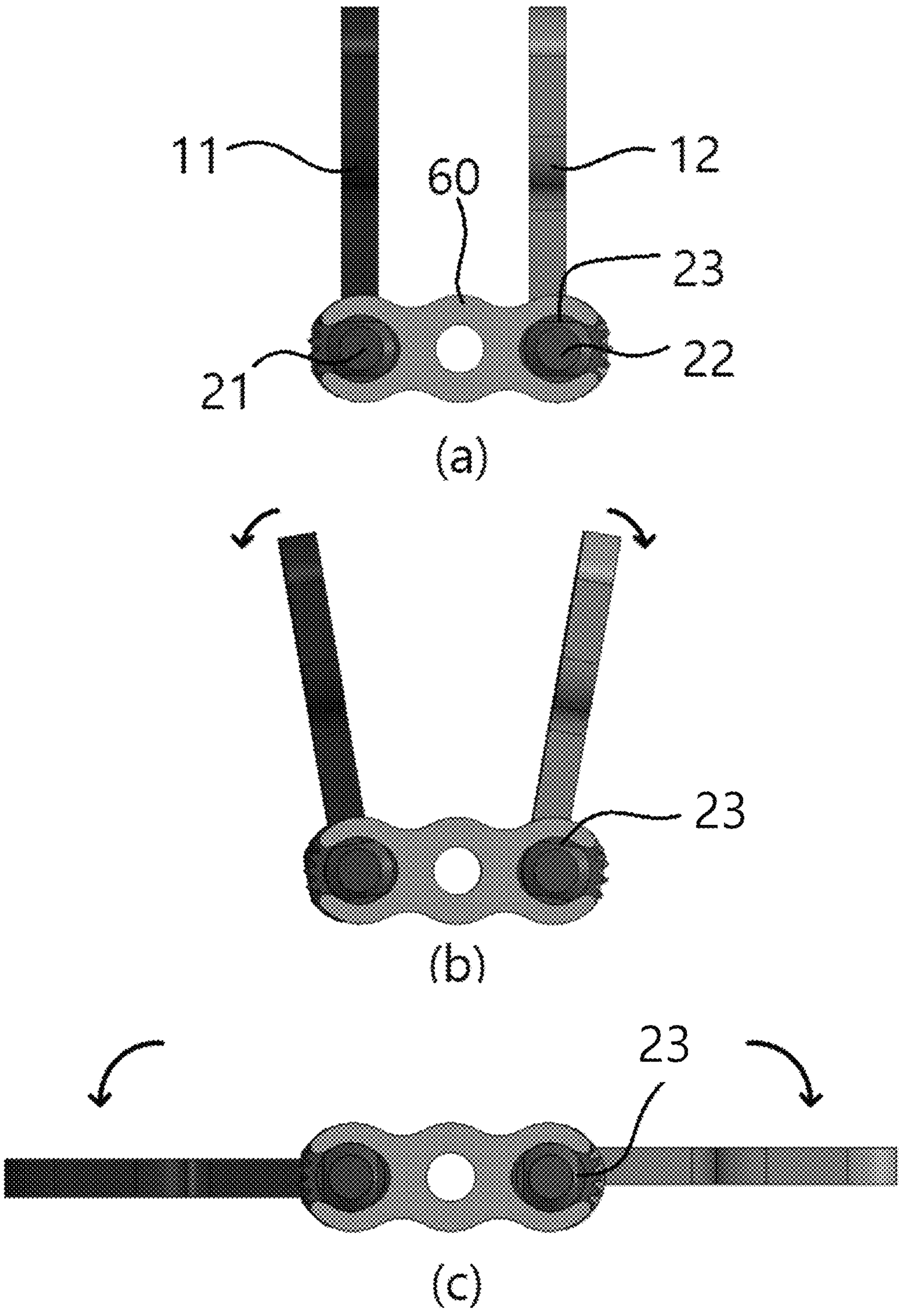
FIG. 10 depicts a view of a state of the shaft and the friction spring of the hinge module at each degree according to the embodiment of the present invention.

As shown in FIG. 6 and (a) of FIG. 10, when the portable terminal is in a closed state, that is, at 0 degrees, the first bracket 11 and the second bracket 12 are arranged to have respective surfaces on one side which face each other.

In this case, a protrusion of the rotary cam surface 13 is inserted into a concave portion of the fixed cam surface 43 due to elastic force of the compression spring 50, and a protrusion of the fixed cam surface 43 is inserted into a concave portion of the rotary cam surface 13.

Further, the outer circumferential surface of the shaft 20 forming an arc shape faces the escape grooves 64 and the opening holes 63, and the two cut surfaces 23 formed on the shaft 20 are arranged to face, at intervals, the inner circumferential surface of the first fitting groove 61 and the inner circumferential surface of the second fitting groove 62.

Hence, in this case, the bracket 10 is maintained as is without being rotated due to coupling force between the rotary cam surface 13 and the fixed cam surface 43 which is generated by the compression spring 50.

When the portable terminal is opened or closed by external force, the first bracket 11 and the second bracket 12 are rotated in opposite directions to each other by the power transmission unit 30.

When the first bracket 11 and the second bracket 12 are rotated in the first zone from 0 degrees to the first angle, an inclined surface of the rotary cam surface 13 formed on the bracket 10 is rotated along an inclined surface of the fixed cam surface 43.

Figure 7:
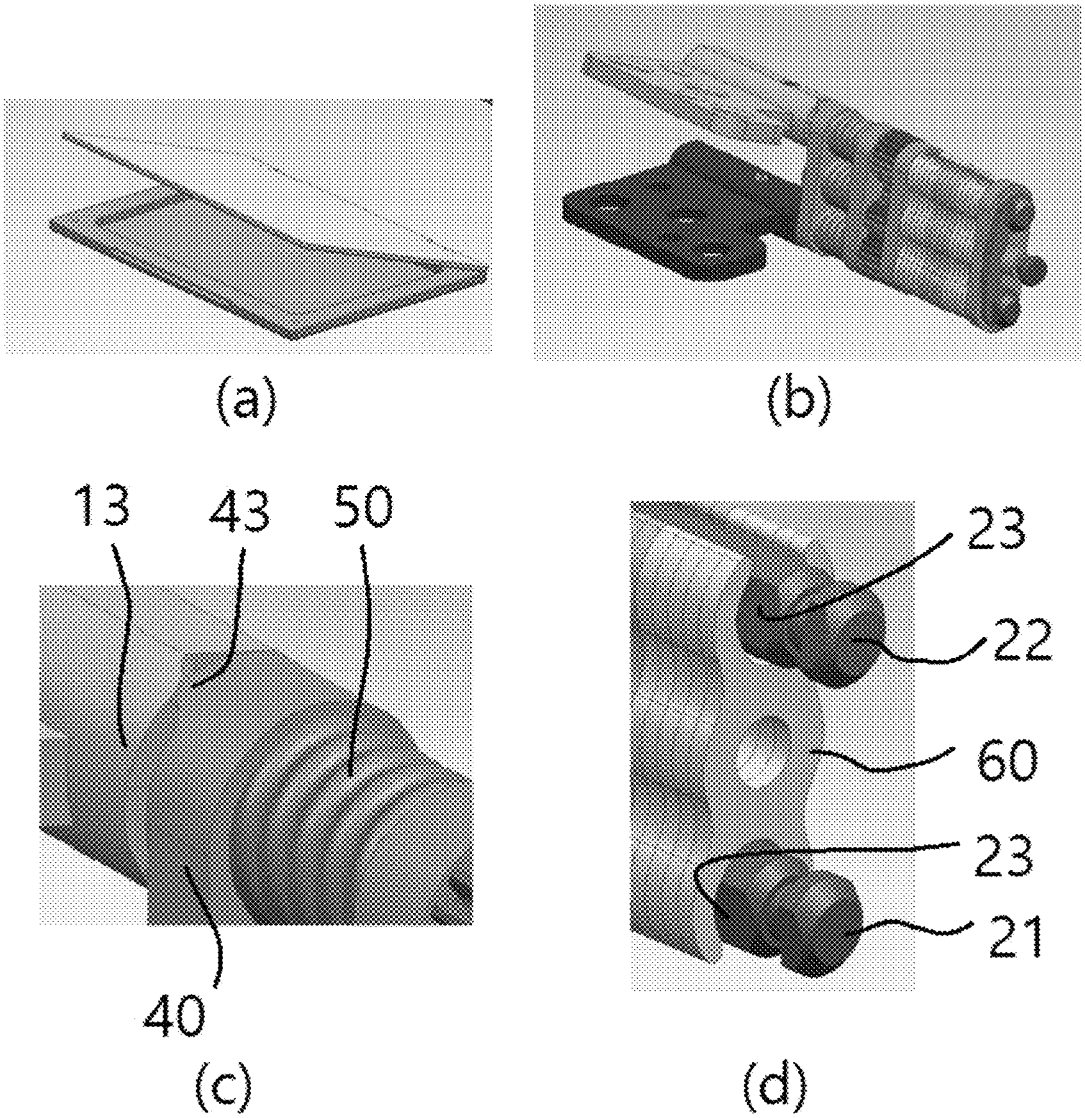
FIG. 7 is a configurational view of a state in which the hinge module is opened by 10 degrees according to the embodiment of the present invention.

FIG. 7 and (b) of FIG. 10 depict a state in which the portable terminal is open at 10 degrees as the first angle. In this case, the sliding cam 40 having the fixed cam surface 43 is moved in a direction in which the compression spring 50 is compressed.

When the external force is removed in the first zone, the compression spring 50 pushes the sliding cam 40 toward the bracket 10. Hence, the first bracket 11 and the second bracket 12 are automatically rotated towards 0 degrees to which one surface of the first bracket 11 and one surface of the second bracket 12 come closer to each other as the inclined surface of the rotary cam surface 13 and the inclined surface of the fixed cam surface 43 are in contact with each other.

That is, in the first zone, in a case where the external force is removed, one surface of the first bracket 11 and one surface of the second bracket 12 are automatically rotated in a direction in which the surfaces face each other, so that the portable terminal maintains a closed state.

In the first zone, as shown in (a) of FIG. 10, both an area of contact between the first fitting groove 61 and the shaft 20 and an area of contact between the second fitting groove 62 and the shaft 20 are very small, and little friction is generated.

Hence, in the first zone, the friction between the friction spring 60 and the shaft 20 is smaller than rotational force due to the contact between the rotary cam surface 13 and the fixed cam surface 43, so the portable terminal is automatically rotated toward 0 degrees at which the portable terminal is closed when the external force is removed in the first zone.

Figure 8:
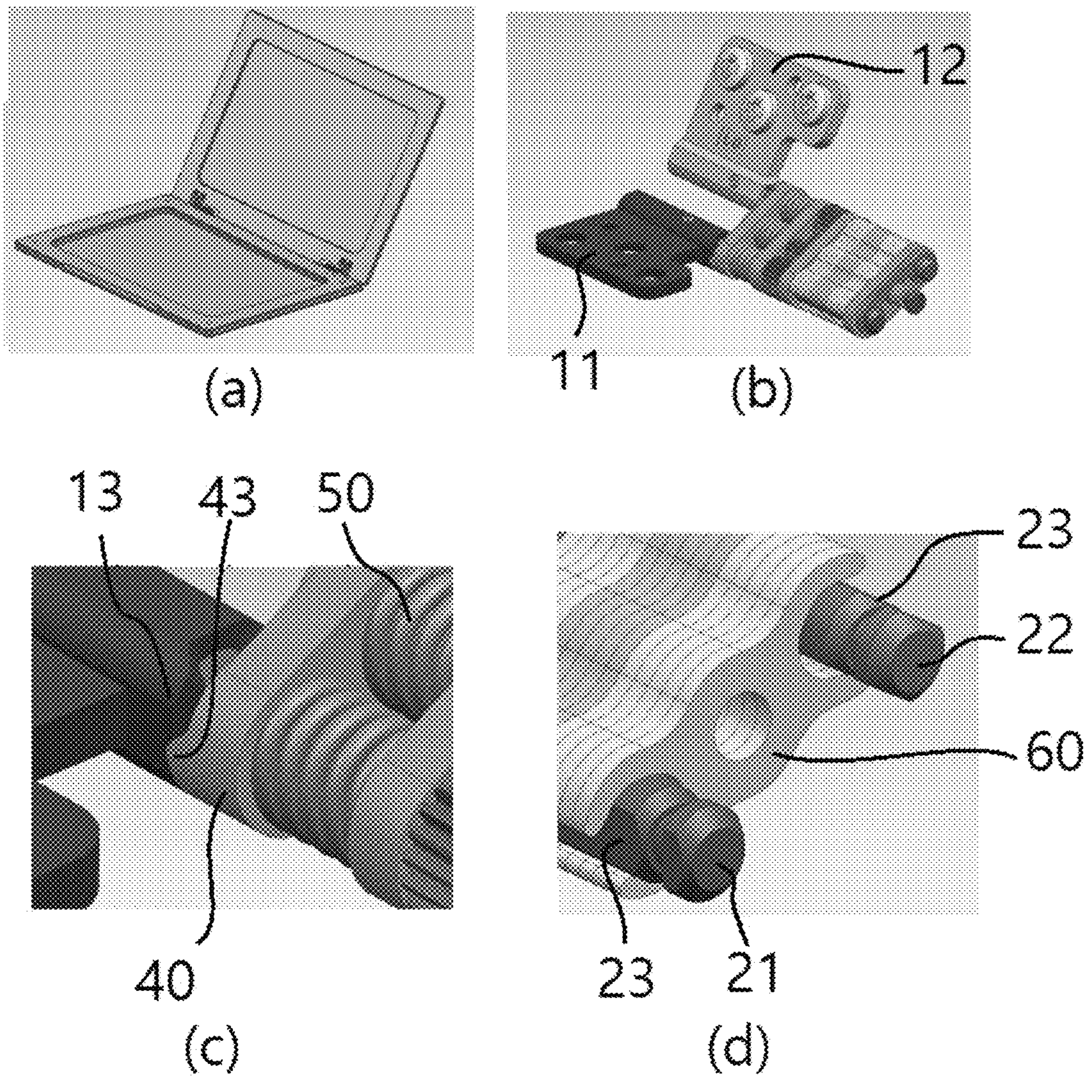
FIG. 8 is a configurational view of a state in which the hinge module is opened by 140 degrees according to the embodiment of the present invention.
Figure 9:
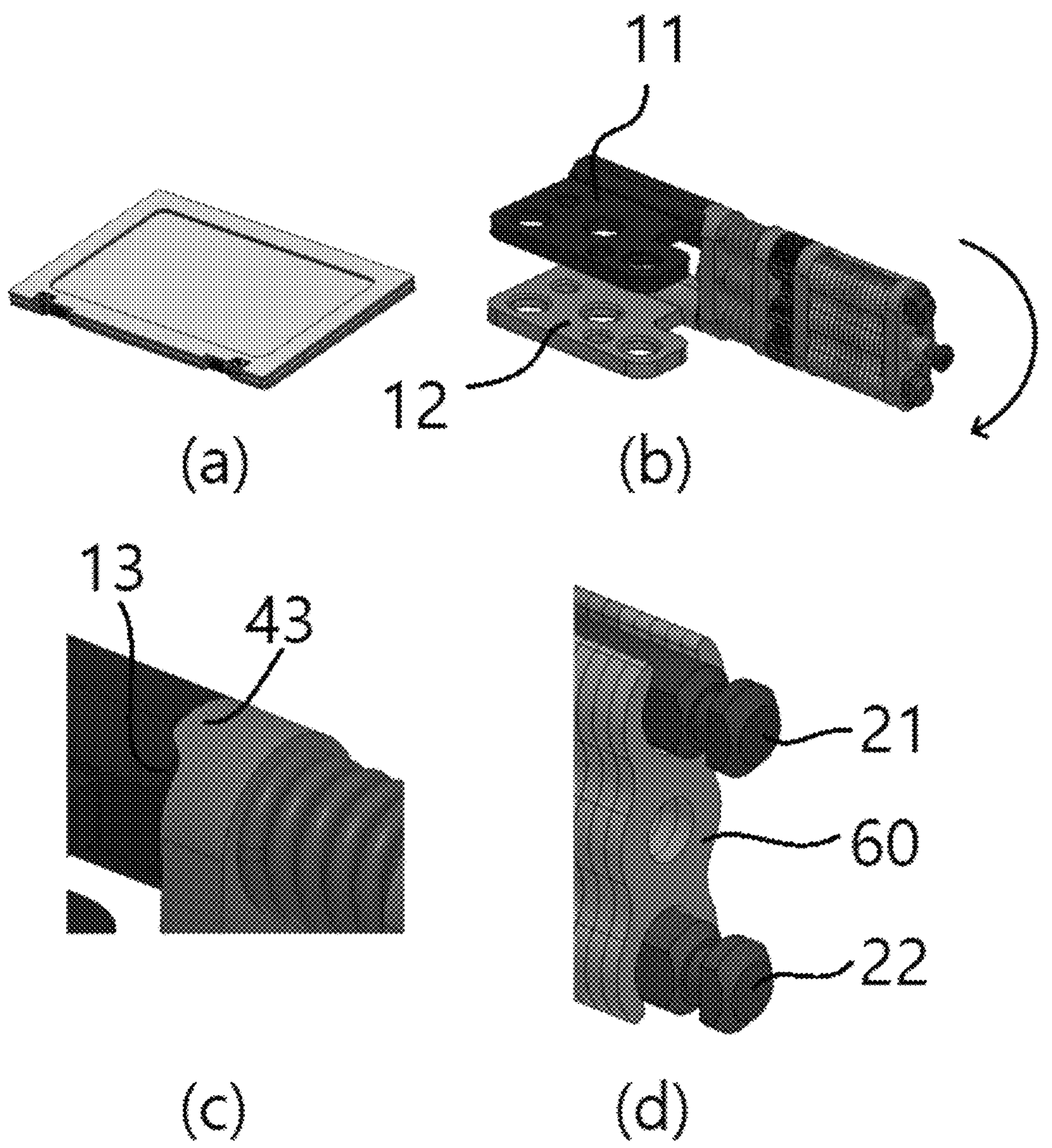
FIG. 9 is a configurational view of a state in which the hinge module is opened by 360 degrees according to the embodiment of the present invention.

As shown in FIG. 8 and (c) of FIG. 10, when the first bracket 11 and the second bracket 12 are rotated in the second zone from an angle greater than the first angle to an angle smaller than the second angle, the rotary cam surface 13 formed on the bracket 10 is rotated along the fixed cam surface 43.

FIG. 8 depicts an opened state in which the portable terminal is rotated by 140 degrees, and (c) of FIG. 10 depicts an opened state in which the portable terminal is rotated by 180 degrees.

In the second zone, rotation is performed in a free-stop manner due to the friction generated as the protrusion of the rotary cam surface 13 and the protrusion of the fixed cam surface 43 are in contact with each other as shown in (c) of FIG. 8 and the friction generated as the friction spring 60 wraps around the outer circumferential surfaces of the first shaft 21 and the second shaft 22 as shown in (d) of FIG. 8 and (c) of FIG. 10.

Since a flat protrusion of the rotary cam surface 13 and a flat protrusion of the fixed cam surface 43 are in contact with each other in the second zone, no rotational force is generated even when the rotary cam surface 13 and the fixed cam surface 43 are in contact with each other.

That is, no rotational force is generated by the contact between the rotary cam surface 13 and the fixed cam surface 43 in the second zone.

Further, when the first bracket 11 and the second bracket 12 are rotated, the shaft 20 is also rotated. In this case, the friction is generated as the cut surfaces 23 of the shaft 20 are rotated toward the opening holes 63 and the escape grooves 64 formed in the friction spring 60, and the outer circumferential surface of the shaft 20 forming the arc shape is in contact with the inner circumferential surfaces of the first fitting groove 61 and the second fitting groove 62 formed in the friction spring 60.

The friction between the friction spring 60 and the shaft 20 in the second zone is greater than the friction between the friction spring 60 and the shaft 20 in the first zone and the third zone.

This is because the contact area between the friction spring 60 and the shaft 20 due to the rotation of the shaft 20 in the second zone is greater than the contact area between the friction spring 60 and the shaft 20 in the first zone and the third zone.

Hence, in the second zone, rotation can be performed in a free-stop manner in which a rotated angle is maintained as is when no external force is applied, due to the friction generated as the protrusion of the rotary cam surface 13 and the protrusion of the fixed cam surface 43 are in contact with each other and the friction generated as the friction spring 60 wraps around the outer circumferential surfaces of the first shaft 21 and the second shaft 22.

In particular, since multiple friction springs 60 are layered, and the friction springs 60 tightly wraps around the outer circumferential surface of the shaft 20, the contact area increases to increase friction and there is a reduction in wear, whereby a torque variation of the shaft 20 is decreased.

The present invention can easily adjust the friction and the torque variation of the shaft 20 by adjusting the number of layers of the friction springs 60 formed in a plate shape.

In the second zone, the angle in the rotated state can be maintained due to the two frictions as described above so that it is possible to prevent the angles of the first panel or the second panel of the portable terminal from being randomly changed or the panels being shaken when a touchscreen formed on the first panel or the second pane is touched.

When the first bracket 11 and the second bracket 12 are rotated in the third zone from the second angle to 360 degrees, the inclined surface of the rotary cam surface 13 formed on the bracket 10 is rotated along the inclined surface of the fixed cam surface 43.

In this case, the sliding cam 40 having the fixed cam surface 43 is moved toward the bracket 10 due to the elastic force of the compression spring 50 that has been compressed.

When the angle between the first bracket 11 and the second bracket 12 is greater than the second angle, the compression spring 50 pushes the sliding cam 40 toward the bracket 10. Hence, the first bracket 11 and the second bracket 12 are automatically rotated towards 360 degrees to which the other surface of the first bracket 11 and the other surface of the second bracket 12 come closer to each other as the inclined surface of the rotary cam surface 13 and the inclined surface of the fixed cam surface 43 are in contact with each other.

That is, in the third zone, in a case where the external force is removed, the other surface of the first bracket 11 and the other surface of the second bracket 12 are automatically rotated in the direction in which the surfaces face each other, so that the portable terminal maintains a 360-degree opened state as shown in FIG. 8.

In the third zone, both of the area of contact between the first fitting groove 61 and the shaft 20 and the area of contact between the second fitting groove 62 and the shaft 20 are very small, and little friction is generated.

Hence, in the third zone, the friction between the friction spring 60 and the shaft 20 is smaller than rotational force due to the contact between the rotary cam surface 13 and the fixed cam surface 43, so the portable terminal is automatically rotated in a direction in which the portable terminal is opened by 360 degrees when the external force is removed in the third zone.

As described above, the present invention enables the portable terminal to be rotated and opened to 360 degrees and to be automatically rotated toward 0 degrees when no external force is applied from 0 degrees to the first angle, to implement free stop by using the strong friction depending on a wide contact area from an angle greater than the first angle to an angle smaller than the second angle, and to be automatically rotated toward 360 degrees when no external force is applied from the second angle to 360 degrees.

In particular, according to the present invention, the contact between the friction spring 60 and the shaft 20 enables the open angle to be firmly maintained between the first angle and the second angle in which rotation is performed in a free-stop manner, and enables shaking of a panel to be minimized even when a user touches the panel.

The 360-degree hinge module of the present invention can be applied to a portable terminal such as a laptop computer, a touchpad, and a smartphone in which two panels can be coupled to each other to be rotated 360 degrees.

The 360-degree hinge module that is the present invention is not limited to the embodiments described above and can be variously modified within the scope of the technique idea of the present invention.

INDUSTRIAL APPLICABILITY

The present invention can be applied to a hinge module for a portable terminal, and thus having industrial applicability.

The invention claimed is:

1. A 360-degree hinge module for a portable terminal that couples a first panel and a second panel to each other in a rotatable manner, the 360-degree hinge module comprising:
- a bracket that includes a first bracket coupled to the first panel and a second bracket coupled to the second panel and has rotary cam surface formed on one side;
- a shaft that includes a first shaft coupled to one side of the first bracket and a second shaft coupled to one side of the second bracket;
- a power transmission unit that connects the first shaft and the second shaft and rotates the shafts in opposite directions;
- a sliding cam that is penetrated by the first shaft and the second shaft and has a fixed cam surface formed to be in contact with the rotary cam surface;
- a compression spring that elastically supports the sliding cam toward the bracket; and
- a friction spring that connects the first shaft and the second shaft to each other while one end of the friction spring wraps around an outer circumferential surface of the first shaft and the other end wraps around an outer circumferential surface of the second shaft;

wherein the first bracket and the second bracket are configured, to be automatically rotated toward 0 degrees to which one surface of the first bracket and one surface of the second bracket come closer to each other as the rotary cam surface and the fixed cam surface are in contact with each other in a first zone from 0 degrees to a preset first angle, to be rotated in a free-stop manner due to friction generated by contact between a protrusion of the rotary cam surface and a protrusion of the fixed cam surface and friction generated by wrapping of the friction spring around the first shaft and the second shaft in a second zone from an angle larger than the first angle to an angle smaller than a preset second angle, and to be automatically rotated toward 360 degrees to which the other surface of the first bracket and the other surface of the second bracket come closer to each other as the rotary cam surface and the fixed cam surface are in contact with each other in a third zone from the second angle to 360 degrees.

2. The 360-degree hinge module for a portable terminal according to claim 1, wherein friction between the friction spring and the shaft in the first zone and the third zone is lower than rotational force by the contact between the rotary cam surface and the fixed cam surface, and friction between the friction spring and the shaft in the second zone is greater than the friction between the friction spring and the shaft in the first zone and the third zone.

3. The 360-degree hinge module for a portable terminal according to claim 2, wherein no rotational force is generated from the contact between the rotary cam surface and the fixed cam surface in the second zone.

4. The 360-degree hinge module for a portable terminal according to claim 2, wherein outer circumferential surfaces of the other ends of the first shaft and the second shaft formed in a cylindrical shape have respective pairs of cut surfaces formed in parallel, the friction spring has, on both sides, a first fitting groove and a second fitting groove into which the other end of the first shaft and the other end of the second shaft are respectively inserted, the first fitting groove and the second fitting groove have respective opening holes formed to be open outward, friction is generated as an inner circumferential surface of the first fitting groove and the outer circumferential surface of the first shaft are in contact with each other and an inner circumferential surface of the second fitting groove and the outer circumferential surface of the second shaft are in contact with each other, and a contact area between the friction spring and the shaft in the second zone is greater than a contact area between the friction spring and the shaft in the first zone and the third zone.

5. The 360-degree hinge module for a portable terminal according to claim 4, wherein the first fitting groove and the second fitting groove have respective escape grooves formed to be more deeply recessed toward a center of the friction spring, in the first zone and the third zone, the outer circumferential surface of the shaft faces the escape grooves and the opening holes, and the cut surfaces are separated from and face the inner circumferential surfaces of the first fitting groove and the second fitting groove, and in the second zone, the outer circumferential surface of the shaft is in contact with the inner circumferential surfaces of the first fitting groove and second fitting groove, and the cut surfaces face the escape grooves and the opening grooves.

6. The 360-degree hinge module for a portable terminal according to claim 5, wherein the escape grooves are filled with lubricant.

7. The 360-degree hinge module for a portable terminal according to claim 4, wherein the friction spring is formed in a plate shape, and multiple friction springs are layered and arranged in a longitudinal direction of the shaft.

* * * * *